United States Patent
Anetsberger et al.

[11] 3,894,483
[45] July 15, 1975

[54] FOOD PRODUCTION HEAT EXCHANGE CONTROL

[75] Inventors: John A. Anetsberger, Chicago; Richard J. Anetsberger, both of Northbrook, Ill.

[73] Assignee: Anetsberger Brothers, Inc., Northbrook, Ill.

[22] Filed: Feb. 7, 1974

[21] Appl. No.: 440,488

[52] U.S. Cl. .............. 99/331; 99/408; 219/492; 236/46
[51] Int. Cl. .............. A47j 27/62; A47d 37/12
[58] Field of Search ...... 219/483, 486, 492; 236/20, 236/46; 237/8 R, 8 A; 99/325, 326, 327, 99/328, 329, 330, 331, 332, 333, 99/403, 407, 408

[56] References Cited
UNITED STATES PATENTS

| | | | |
|---|---|---|---|
| 2,501,452 | 3/1950 | Pratt | 236/46 X |
| 2,571,822 | 10/1951 | Bohn | 236/46 X |
| 3,217,633 | 11/1965 | Anetsberger | 99/327 |
| 3,578,950 | 5/1971 | Moratz | 219/486 |

Primary Examiner—Harvey C. Hornsby
Assistant Examiner—Arthur O. Henderson
Attorney, Agent, or Firm—McCaleb, Lucas & Brugman

[57] ABSTRACT

Novel method and apparatus for controlling food production equipment (having conventional thermostat means) which is operable upon placement of a load of food product into the equipment's thermal energy transfer medium to immediately initiate operation of a thermal energy source and continue same allowing the thermostat means to ultimately react to temperature variations from a desired operating temperature within the thermal energy transfer medium and assume continued energy source operation until re-establishment of the desired operating temperature, thereby effectively minimizing the overall heat recovery time in a given food production cycle by eliminating the effects of the normal time reaction lag attendant conventional thermostat means, while further effectively reducing the overall temperature differential within a given food preparation cycle resulting in more uniform, high quality food products.

7 Claims, 3 Drawing Figures

TESTS CONDUCTED USING 5 LBS. POTATOES

FOOD PRODUCTION HEAT EXCHANGE CONTROL

BACKGROUND OF THE INVENTION

1. Field of the Invention

The present invention relates in general to food production equipment and method and more particularly to heat exchange control means for minimizing the temperature recovery time when food is introduced, as in a deep fat fryer.

2. Description of the Prior Art

Burner ignition in food production equipment, such as deep fat fryers, has normally been provided through conventional thermostat means like those described in U.S. Pat. No. 3,217,633.

When a batch of food is immersed in fat which is being maintained at the desired cooking temperature, there is an immediate temperature drop in the shortening due to the cooler temperature of the food and the moisture escaping from it. At this point in a cooking or frying cycle, the thermostat disposed within the shortening kettle will sense the temperature drop and signal for ignition of the burners. This call for heat will, in turn, raise the shortening temperature back to the desired frying temperature which must be maintained to result in uniform fried products.

Accordingly, in a given frying cycle, the shortening temperature drops from an initial idling temperature to the lowest point in the temperature cycle, and then returns to the original temperature. However, there is a lag between the time when the food is immersed in the shortening causing an immediate temperature drop and the time when the thermostat calls for heat. This time lag is normally anywhere from 10 to 75 seconds or more, depending on the heated medium, amount and temperature of the load and the sensitivity of the thermostat employed, and is referred to as 'thermostat time reaction lag.' The time interval between food immersion and the return of the fat to the desired predetermined temperature is referred to as 'the heat recovery time'. Thermostat time reaction lag occurs because either the fluids in the capillary tubes or the bi-metal strips of the thermostat must expand and set the points in the thermostat before the thermostat is in a condition to signal for burner ignition.

SUMMARY OF THE INVENTION

The present invention overcomes this thermostat time reaction lag, thereby effectively shortening the heat recovery time, by holding the frying fat temperature throughout the entire frying cycle as close as possible to the desired frying temperature. This desired temperature is also the one at which the shortening is originally idling. Creating such a narrow temperature gradient is done with a deep fat fryer by initiating burner operation before or as the food is immersed into the shortening by either combining a bypass reset timer with a well-known adjustable frying cycle timer or manual start switch, or by tying in the bypass reset and cycle timers with an automatic lowering basket lift, such as that disclosed in U.S. Pat. No. 3,273,488. The resulting reduction in temperature drop in a given frying cycle obtains a more accurate high-low temperature differential, thereby resulting in improved fried food quality. One improvement in maintaining a more even temperature gradient is that the less the temperature drop, the less fat absorption there will be in the fried food product. This is because a food product such as fish, chicken, shrimp or potatoes will absorb less oil if fried in shortening maintained at an elevated temperature than if at a lower temperature.

It is an object of this invention to overcome the thermostat time reaction lag in a given food production cycle.

It is a further object of this invention to effectively shorten the over-all heat recovery time in a given frying, grilling or cooking operation.

Alternatively, it is a further object of this invention to effectively shorten the over-all cold recovery time of the cooled medium in a given refrigeration or freezing operation.

It is another object of this invention to save on the amount of fuel required in a given cooking operation.

It is still another object of this invention to reduce the over-all temperature drop in a given cycle of a cooking operation, thereby holding the given cycle to a more accurate high-low temperature differential, so as to result in a more uniform, high quality cooked food product.

Other objects and advantages of this invention will be apparent as the detailed description of a preferred form of the invention in its operation proceeds with reference to the accompanying drawings:

DESCRIPTION OF THE PREFERRED EMBODIMENT

Figure 1:
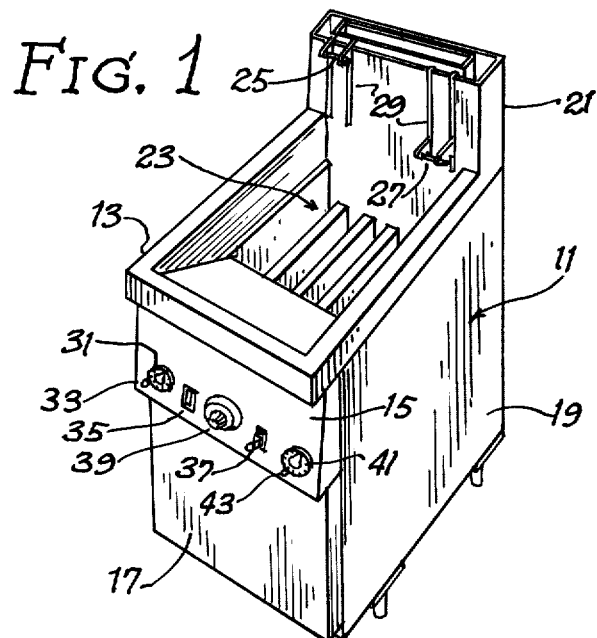
FIG. 1 is a perspective view of a typical deep fat fryer within which the present invention can be utilized.

Referring more particularly to FIG. 1, reference numeral 11 indicates in general a deep fat fryer comprising a shell-like casing made up of a left side wall 13, a control panel 15 located on the upper portion of a front wall 17, a right side wall 19, and a rear wall 21. Formed internally of the various shell casing walls in any well-known manner is a shortening kettle, indicated generally by reference numeral 23. A pair of independently vertically movable basket support hangers, left hanger 25 and right hanger 27, ride within vertical slots 29 formed in rear wall 21, as shown in FIG. 1. Any well-known type of wire basket or basket extension frame (neither is shown in the drawings) can be hung on these support hangers for operational support. A full disclosure and detailed explanation of the structural components of a twin basket raising mechanism for moving hangers 25, 27 may be found in U.S. Pat. No. 3,273,488. Moreover, a full explanation of the electrical circuitry necessary to operate a basket raising mechanism may be found in my afore-mentioned U.S. Pat. No. 3,217,633.

As best seen in FIG. 1, control panel 15 has mounted on it for operational support several electrical controls consisting of left cycle timer 31 and its corresponding left starter button 33, heat indicating light 35, master switch 37, thermostat control 39, and right cycle timer 41 with its corresponding right starter button 43.

The provision of well-known thermostatic control means such as thermostat control 39 allows selective control of the fryer's burner means so as to maintain the frying shortening at any desired pre-selected temperature. This is done by manually setting the thermostat control 39 at the desired shortening temperature below which the control is to signal for burner ignition.

Figure 2:
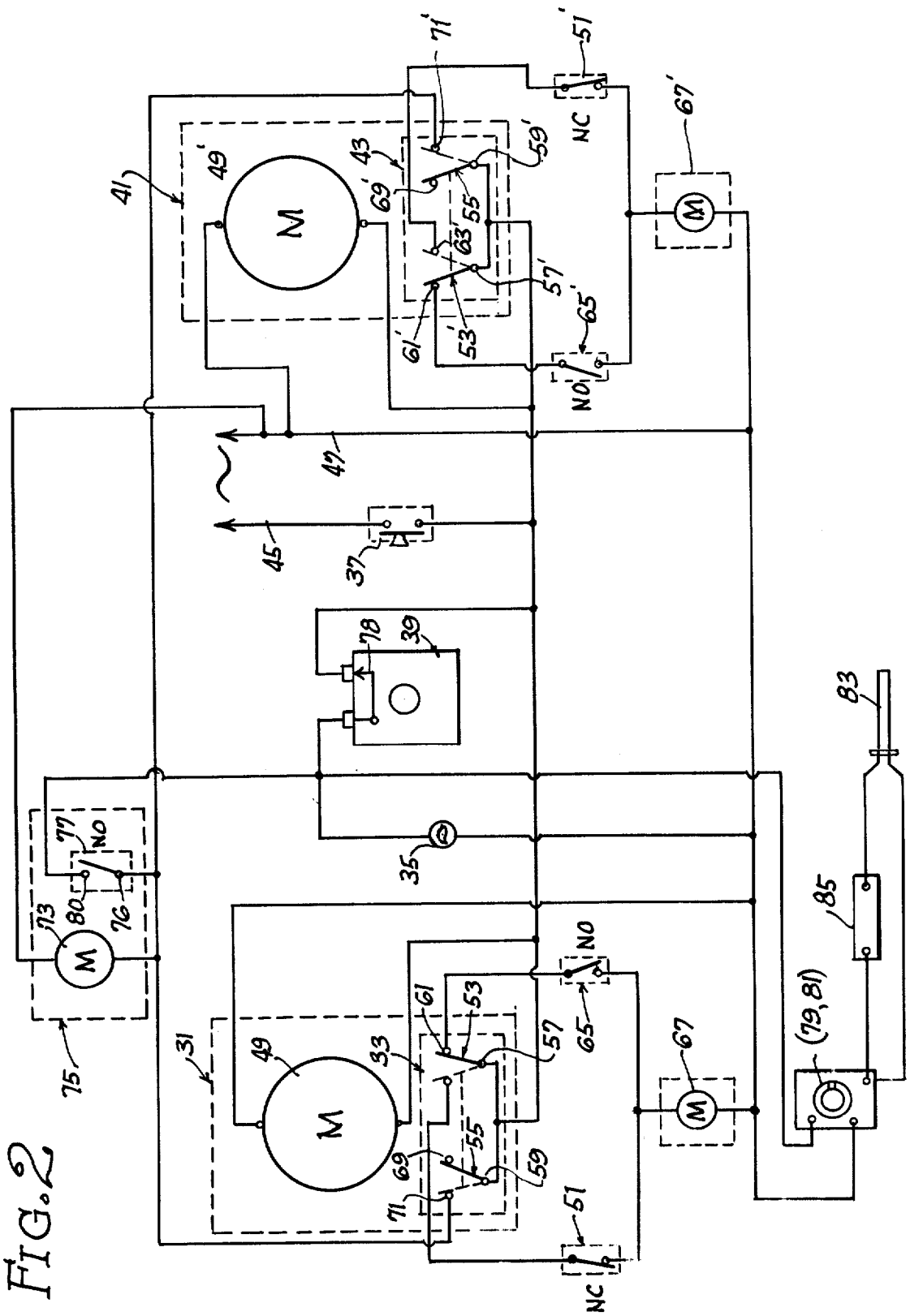
FIG. 2 is a wiring diagram of the electrical circuit employed in the preferred embodiment of the instant invention.

Referring now to FIG. 2, the electrical circuit utilized in the present invention is composed of two identical circuits, one concerned with imparting raising and lowering movements to left hanger 25, and the other for imparting similar but independent movements to right hanger 27. Since both sides of the circuit in FIG. 2 have identical components and since burner ignition results no matter which hanger is used, the following description pertains to the left side of the circuit. Prime marks after reference numerals indicate components in the right side of the circuit identical to the lefthand components.

Energization of the entire circuit of FIG. 2 is accomplished through the use of a suitable source of electrical energy comprising a line 45 within which master switch 37 is placed and a second line 47. Left cycle timer 31 is comprised of a motor 49 one side of which is connected to line 47. The other side of motor 49 is connected to line 45. Starter button 33 which is mounted in a co-operating relationship with cycle timer 31, is comprised of a pair of ganged, double-throw, single blade switches 53, 55. Contact 57 of switch 53 and contact 59 of switch 55 are both connected to line 45. Contact 57 normally engages contact 61 and is separate from contact 63 which is connected to a normally closed, lower micro switch 51. Contact 61 is connected to a normally open upper micro switch 65 which is connected, along with lower micro switch 51, to one side of lifting motor 67, the other side of which is connected to line 47. The respective normally open and closed microswitches 65, 51 are operationally closed and opened at appropriate times by any well-known means, such as cam means described in U.S. Pat. No. 3,217,633.

Contact 59 normally engages isolated contact 69 and is separate from contact 71 which is connected in part to one side of a motor 73, one of two component parts of a bypass reset timer 75. The other side of motor 73 is connected to line 47. The second component part of bypass reset timer 75 is a normally open micro switch 77 having one contact 76 connected along with one side of motor 73 to contact 71 of starter button 33. Energization of motor 73 causes the closing of micro switch 77, such as by well-known cam means, for a preset period of time.

Thermostat control 39 contains a switch 78, one side of which is connected to line 45. The other side of switch 78 is connected to one side of the parallel combination of light 35 and a gas control circuit including a solenoid 79 and a gas control valve 81. Contact 80, the second contact of micro switch 77, is also connected to the same side of this parallel combination. The other side of this parallel combination is connected to line 47. A thermopile 83 and a high-limit thermostat 85 provide a safety circuit.

It is readily apparent that if switch 77 is closed, a circuit is completed to bypass thermostat control 39 thereby effectively overriding its operating function of sensing termperature drop and signalling for burner ignition. However, whether switch 77 or switch 78 is the switch through which a circuit is completed to energize solenoid 79 so that it opens gas control valve 81, heat indicating light 35 indicates this operating condition.

Under normal operating conditions, master switch 37 is closed and the burners are cyclically turned on and off by an ignition signal from thermostat control 39, thereby idling the shortening at a desired, pre-selected frying temperature, such as 350 degrees Fahrenheit by way of example. This desired temperature is initially set on the thermostatic control 39. To initiate a food frying cycle, the food product is loaded into a fryer basket (not shown) which may be placed onto left support hanger 25. The desired length of frying time is set on the left cycle timer 31, as is the desired length of thermostat control bypass time on the bypass reset timer 75. Starter button 33 is then engaged moving switches 53, 55 away from their respective normal engagements with contacts 61, 69. When contact 57 is engaged with contact 63, a circuit is completed from line 45 through contacts 57, 63 and the normally closed, lower micro switch 51 thereby initiating lowering action of motor 67, the operation of which is more fully described in U.S. Pat. No. 3,273,488. Such starter button engagement also correspondingly causes completion of a circuit from line 45 through motor 49 and line 47 thereby initiating that motor's timing action.

As contact 59 is moved into engagement with contact 71, a circuit is completed from line 45 through motor 73 of bypass reset timer 75 thereby closing the points of the normally open micro switch 77. As previously noted, closing of micro switch 77 completes a circuit through solenoid 79 and immediately energizes the same which in turn opens gas valve 81 causing burner ignition. Bypass reset timer 75 can be manually set for a time period, such as 20 seconds by way of example, after which micro switch 77 will automatically open. The immediate signalling for burner ignition by micro switch 77 caused by completing the circuit through line 45, contacts 59, 71 and motor 73, allows switch 78 to slowly react to the rapid reduction in frying fat temperature caused by the immersion of a food product without having the attendant normal time lag create any detrimental effects. It is apparent that the bypass reset timer 75 must be preset for a period longer than that amount of time necessary for switch 78 to react to food immersion temperature reduction thereby closing itself, so that once this bypass preset time has ended causing micro switch 77 to open, switch 78 will have closed, allowing thermostat control 39 to maintain burner operation. Thus, even though micro switch 77 eventually opens after its preset time of motor 73 has elapsed, this has no effect on burner operation, as the latter is taken over and continued by thermostat control 39 until the pre-selected frying temperature is reached.

The preferred embodiment of the present invention incorporates a thermopile 83 situated within the pilot light of the burner so that if there is pilot light failure, thermopile 83 will open the circuit containing solenoid 79 thereby shutting down the operation of fryer 11 for safety purposes. Furthermore, if bypass reset timer 75 would happen to fail thereby maintaining micro switch 77 in a closed condition, or alternatively, if thermostat control 39 would happen to fail maintaining switch 78 in a closed condition, there is a possibility that the burners would be maintained in an operating condition which after a sufficient amount of time could cause self-ignition of the frying fat at elevated temperatures, such as 425°F. However, the high-limit thermostat 85 having an upper limit temperature, such as 390° by way of example, will open under such circumstances to shut down the entire burner operation.

While bypass reset timer 75 is signalling burner ignition during its preset time period, the support hanger 25 is lowering a wire basket containing the food product into the frying fat. Since frying fat temperature reduction occurs only upon food immersion, there is a possibility that pre-ignition of the burners through micro switch 77 and gas control valve 81 could cause the frying fat temperature to rise above the desired preselected temperature. However, the heat exchangers in most prior art or currently available deep fat fryers require at least 10 to 20 seconds to transfer heat through shortening kettle 23 into the frying fat. The result is that concurrently as food immersion begins to reduce frying fat temperature, additional heat due to the early ignition of the burners by virtue of operation of timer 75 is available to raise and thereafter maintain the frying fat at the desired temperature.

It must be noted that during a given frying cycle, bypass reset timer 75 is unable to reset itself for a new cycle even though motor 73 has ended its preset time interval and thereby opened micro switch 77. It is only when motor 49 has switched the ganged, double-throw, single blade switches 53, 55 back to their normal respective engagements with contacts 61, 69 that bypass reset timer 75 will be in a reset position available to function for a new cycle. Thus, if left starter button 33 is engaged, and the preset time interval of bypass reset timer 75 has elapsed, and burner operation has been taken over and continued by switch 78, bypass reset timer 75 is unable to again close normally open micro switch 77 if, perchance, right starter button 43 is engaged. This is because bypass reset timer 75 is still under a power bias through contacts 59, 71. It is only after switch 55 is re-engaged with contact 69 that bypass reset timer 75 is in a condition to reset itself. It must be noted that if right cycle timer 45 is initiated during the time that switch 78 maintains burner operation in a frying cycle initially originating with left cycle timer 31, bypass reset timer 75 will not reset itself until switch 55' re-engages contact 59' with contact 69'. It will be further noted that right cycle timer 41 can be initiated first in conjunction with a later engagement of cycle timer 31, or wholly by itself, thereby utilizing only the right side of the circuit in FIG. 2.

Figure 3:
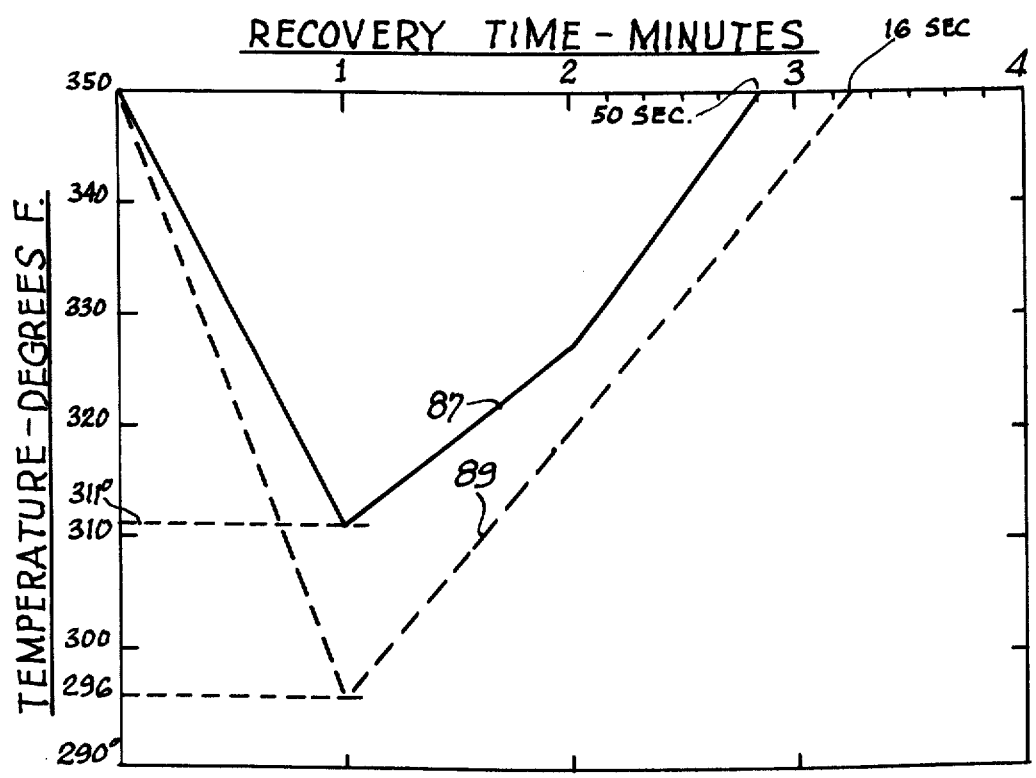
FIG. 3 is a comparison graph illustrating over-all heat recovery times for the same fryer with and without the use of the present invention.

From the foregoing description, it will now better be appreciated why this present invention is able to attain a material reduction in the heat recovery time in a given cooking operation and a corresponding decrease in frying fat temperature reduction. The burner unit cooking control contemplated, such as that herein described, results in the earliest ignition of the burners possible to counteract fat temperature reduction due to food immersion. As is graphically illustrated in FIG. 3 of the drawings, curve 87 represents the change in temperature of the frying shortening which results from the immersion of a specific load of food products (potatoes prepared for french-fries) into the shortening that has an initial idling temperature of 350° and is contained within a fryer utilizing the present invention. The broken line curve 89 in the comparison graph of FIG. 3 represents the change in frying fat temperature due to immersion of an identical load of food products into the same fryer without the present invention and again with the shortening maintained at an initial idling temperature of 350°. Use of the present invention as represented by curve 87, causes immediate burner ignition. It will be noted that food immersion caused the fat temperature to drop from 350° to 311° during the first minute period. After that point, the recovery time required to raise the fat temperature back to 350° was 1.83 minutes. In comparison with those results, the same test in the same fryer without the present invention, as represented by curve 89, resulted in a temperature drop in the first minute to 296°. An additional two and one quarter minutes were required to raise the fat temperature back to the desired frying temperature. Furthermore, in the frying test resulting in curve 89, the fryer burners remained off for 13 seconds until the thermostat reacted to the food immersion temperature drop and signalled burner ignition. This correspondingly caused the 15 degree lower temperature reduction than that found in curve 87. Accordingly, the 15° or 27.7% less temperature drop of curve 87 over curve 89 resulted in a 13.2 per cent fuel savings. Similar tests conducted on different fryers utilizing identical food product loads and initial temperature resulted in fuel savings from 15.7 to 19 per cent because of respective lesser temperature drops of from 15° to 21° when the present invention was utilized.

The graph illustrated in FIG. 3 emphasizes the material reduction in heat recovery time resulting in a deep fryer utilizing the instant invention. Moreover, it emphasizes the reduced drop of fat temperature due to food immersion, viz., from a 350° idling temperature down to 296° with a fryer of conventional construction, but only down to 311° for the same fryer using the instant invention. The fact that the present invention results in a higher low-end temperature in a fryer's heat recovery cycle correspondingly causes less fat absorption by the fried food product.

Turning now to another possible embodiment of the present invention, it must be noted that the bypass reset timer need not be tied into the automatic lowering of a fully automatic fryer, but can be initiated along with cycle timer or a starter button engagement while a load of food product is concurrently manually lowered into the frying fat.

Besides giving significant advantages during the heat recovery cycle of a deep fat fryer such as that described in the disclosure of the preferred embodiment herein, it is to be understood that the present invention also can be incorporated in other types of food production operations using thermal transmission, whether it be for heating or cooling. Pertinent examples of other uses of the present invention are in baking operations where the burners can be pre-activated to re-heat the heated cavity when the temperature is reduced due to insertion of food to be baked through an opening; and refrigeration or freezing operations where the cooling source can be engaged upon opening a door to the cold cavity. Accordingly, the present invention is not intended to be limited to deep fat fryers, but rather is for all types of food production devices utilizing heat transfer means. Furthermore, such heat transfer means are not meant by the above description to be limited to gas burners, but also can include electricity, steam or other sources of thermal energy.

From the foregoing, it is believed that those skilled in the art will readily appreciate the unique features and advantages of the present invention over previous types of controls for food production equipment. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

We claim:

1. In cooking apparatus having a cooking chamber, burner means for heating a cooking medium in said chamber, and control means for said burner means including a main thermostat operable, in response to lowering of the temperature of said cooking medium below a predetermined temperature resulting from the introduction of food to be cooked into said medium, to actuate said control means to initiate operation of said burner means; means for eliminating the normal time lag in actuating said control means in response to said main thermostat, comprising a short period timer operable as the food is introduced into said medium to immediately actuate said control means to initiate operation of said burner means.

2. Cooking apparatus according to claim 1, wherein said control means comprises an electrically operable valve, and said short period timer is electrically connected to said valve in parallel with said main thermostat.

3. In cooking apparatus according to claim 1, wherein delivery means is provided for introducing the food to be cooked into said cooking medium, means automatically operable by said delivery means as the same introduces said food into said cooking medium to initiate operation of said short period timer.

4. In a control system for the maintenance of a desired, pre-selected temperature in food preparation production apparatus having a transfer medium for the conveyance of thermal energy from an energy source to the food, the combination comprising:

thermostat means ultimately reactive to a temperature variation from said desired temperature for initiating operation of said energy source and maintaining such operation until said desired temperature is re-established; bypass reset timer means for causing immediate initiation and operation of said energy source for a sufficient time period until said thermostat means has reacted to said temperature variation to signal said continued energy source operation; and control means operable upon introduction of food into said transfer medium to initiate operation of said bypass reset timer means.

5. A control system according to claim 4, wherein said bypass reset timer means is electrically connected in parallel across said thermostat means.

6. In a control system according to claim 4, automatic handling means for introduction of said food into said transfer medium, wherein said control means simultaneously initiates operation of said automatic handling means and said bypass reset timer means.

7. In a control system for maintaining an operating temperature throughout the entire food preparation cycle of a food production device having a source of thermal energy, control means for said source, and a thermal medium through which said thermal energy is transferred to food, the combination comprising:

thermostat means responsive to temperature departures from said operating temperature within said thermal medium for signalling operation of said control means; bypass reset timer means operable when engaged to immediately initiate operation of said control means and continue same, said bypass reset timer means initiation overriding said thermostat means until the latter's time reaction lag to said temperature departures has ended allowing said thermostat means signalling to continue said control means operation.

* * * * *